INVENTORS
HAROLD LE VAN HANSEN
HAROLD ERNEST SPAULDING
BY Robert P. Auber
George W. Reiber
ATTORNEYS

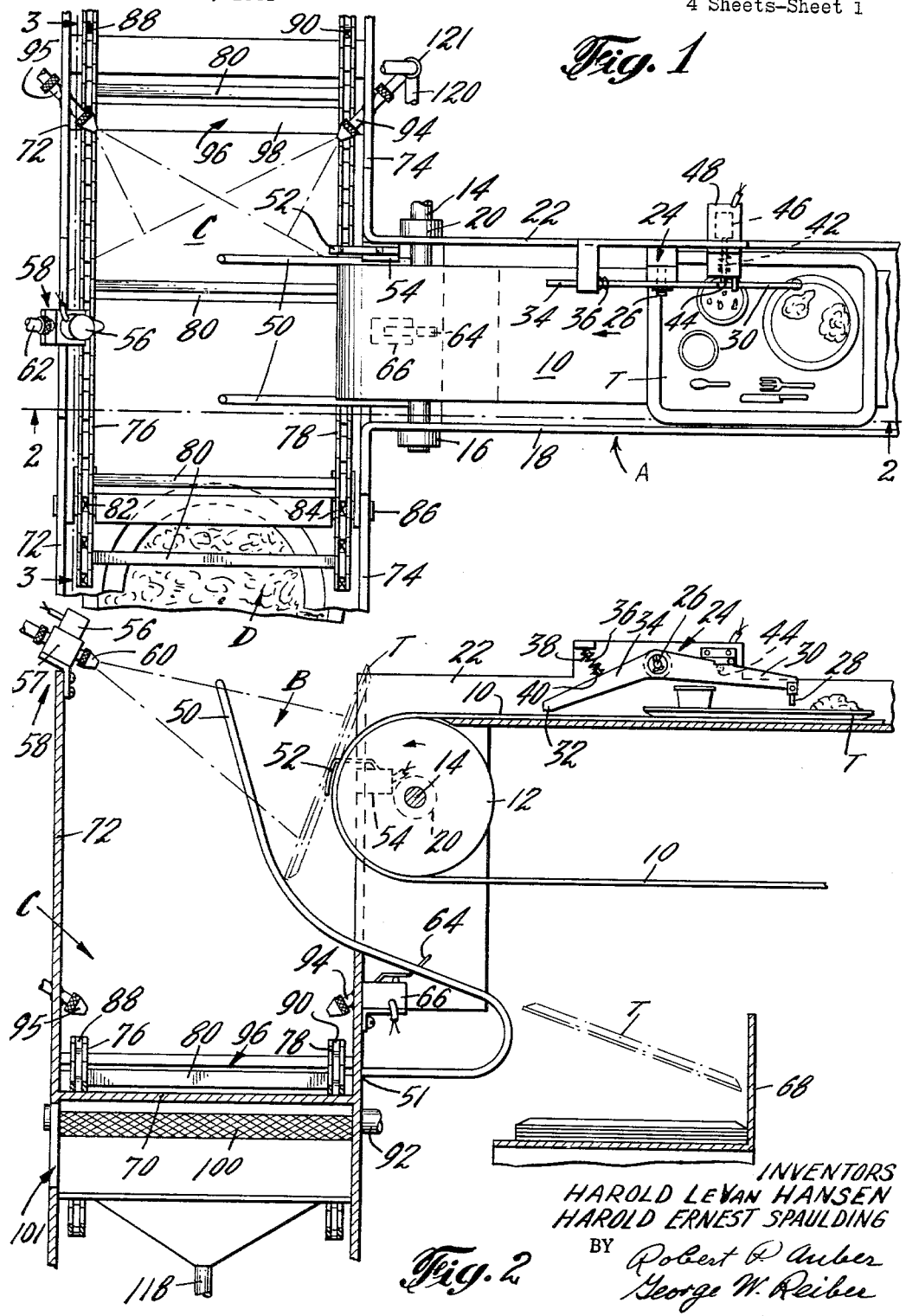

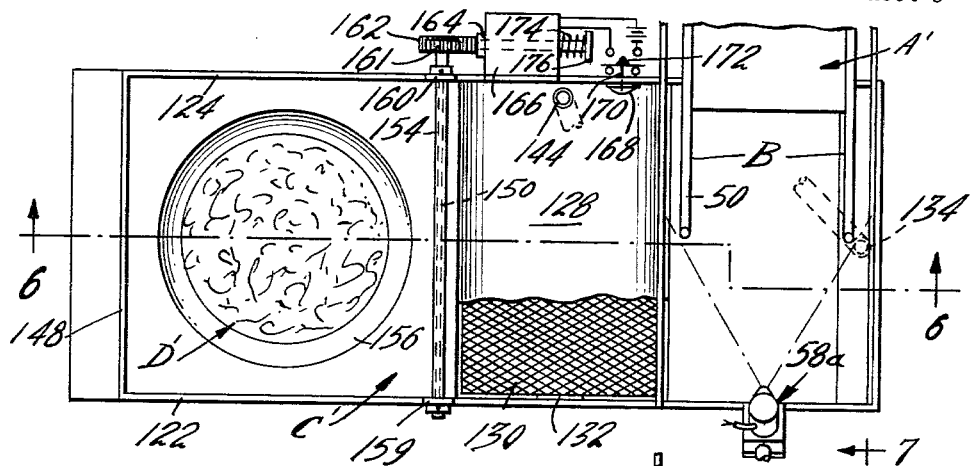
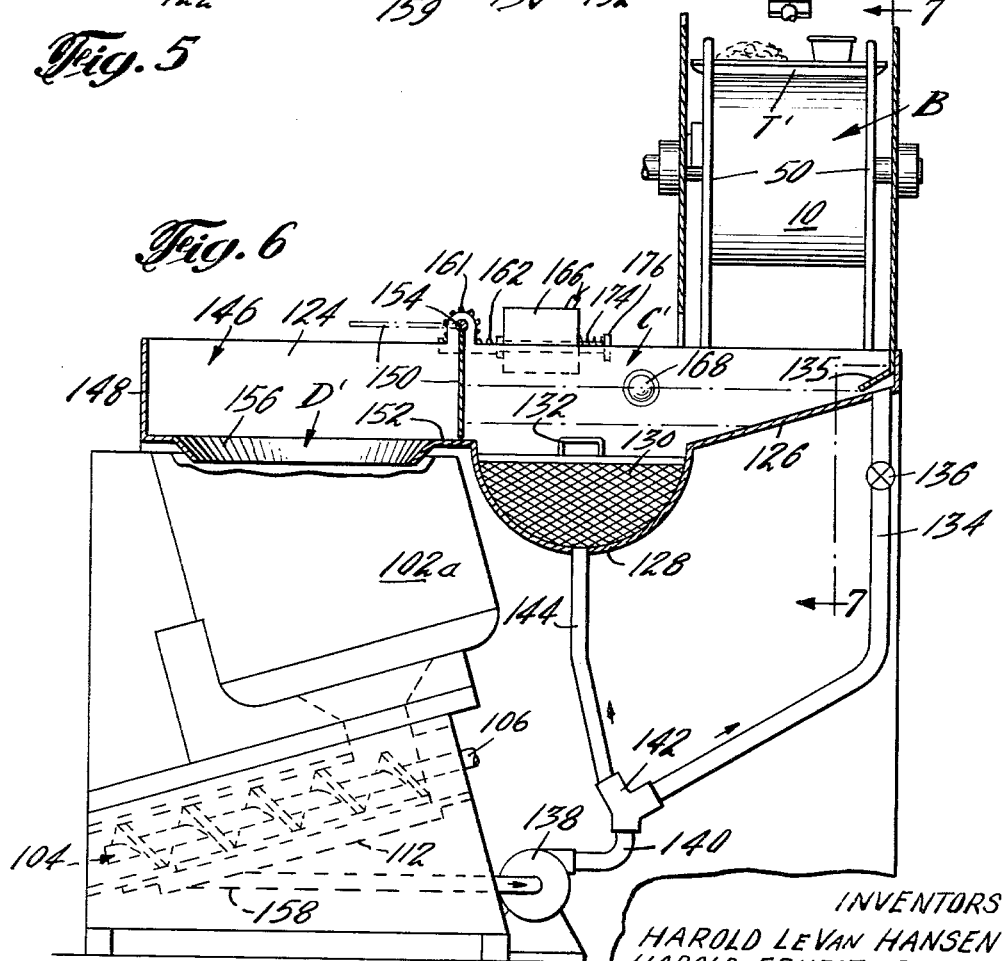

United States Patent Office 3,232,425
Patented Feb. 1, 1966

3,232,425
SEPARATOR-DISPOSAL APPARATUS
Harold Le Van Hansen, Phillipsburg, N.J., and Harold Ernest Spaulding, Palmer Township, Northampton County, Pa., assignors to American Can Company, New York, N.Y., a corporation of New Jersey
Filed Oct. 18, 1961, Ser. No. 145,952
5 Claims. (Cl. 209—12)

The present invention relates to an apparatus for separating reuseable eating utensils from disposable waste or refuse and the disposal of such refuse. More particularly it pertains to an integrated automatic apparatus for use in commercial feeding establishments wherein reuseable eating utensils are separated from disposable refuse, the eating utensils being automatically moved to a suitable place of deposit and the refuse being carried to a unit which puts this refuse in a condition for easy handling and disposal.

It is therefore an object of the instant invention to provide an apparatus for the automatic separation of reuseable eating utensils and disposable refuse.

It is a further object to provide an apparatus of the character described which requires very little human supervision or labor.

Another object is to provide an apparatus for the automated sorting of reuseable eating utensils and disposable refuse for use in large scale or commercial feeding establishments.

Still a further object is to provide an apparatus especially adapted to the sorting of reuseable cutlery and serving trays from food refuse and disposable paper service.

Numerous other objects and advantages of the invention will be apparent as it is better understood from the following description, which, taken in connection with the accompanying drawings, discloses a preferred embodiment thereof.

Referring to the drawings:

FIG. 1 is a plan view of the apparatus of the instant invention with parts broken away;

FIG. 2 is a side elevational view, partly in section, taken substantially along line 2—2 of FIG. 1;

FIG. 5 is a plan view of a modified form of the subject apparatus with parts broken away;

FIG. 6 is a front elevational view, partly in section, taken substantially along line 6—6 of FIG. 5.

Figure 3:
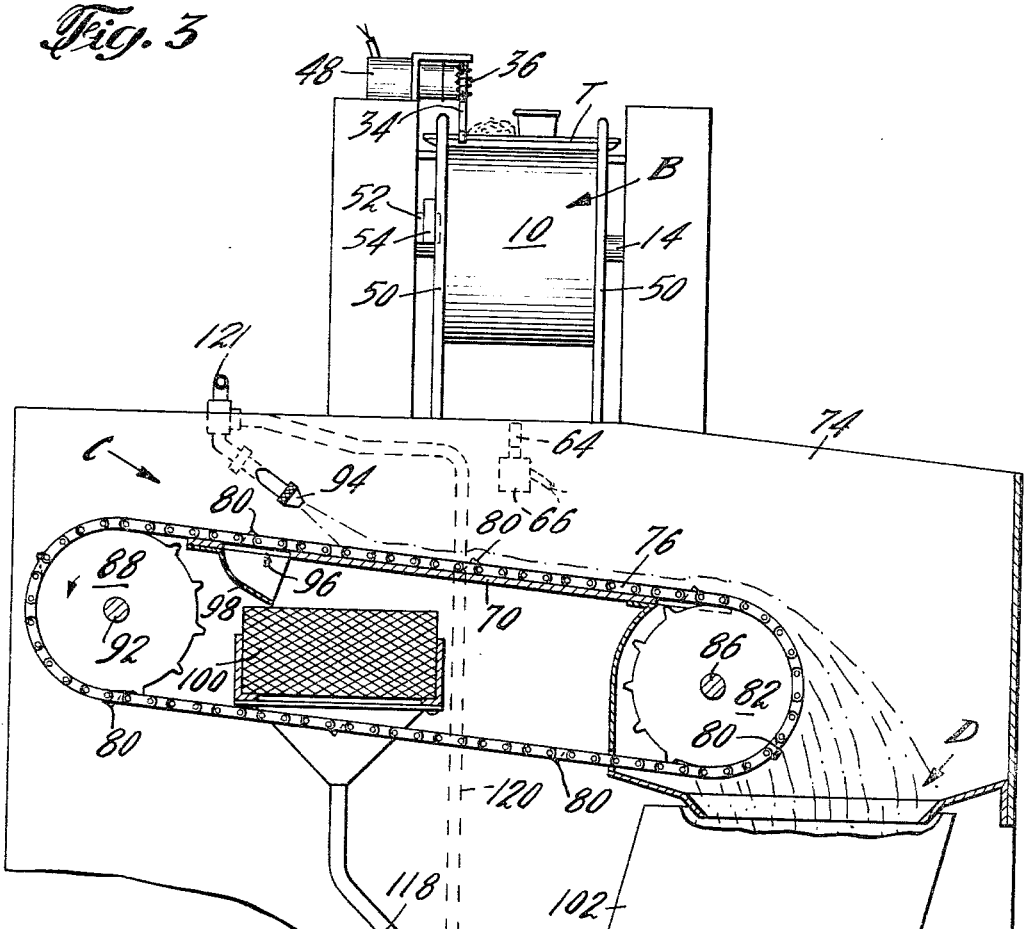
FIG. 3 is a front elevational view, partly in section, taken substantially along line 3—3 of FIG. 1.

In general, the apparatus of the instant invention comprises a horizontally moving conveyor A for receiving and transporting a soiled serving tray T having a combination of reuseable utensils and disposable waste or refuse thereon, along a path of travel to a tipping device B at one end of the conveyor A whereupon the tray T is tipped towards a vertical position to permit the utensils and refuse to fall therefrom by the action of gravity. The utensils and refuse so removed from the tray T fall into a trough C wherein the refuse having a lower specific gravity than the utensils is floated away from the utensils and carried to a disposal unit D wherein it is automatically put in a form for easy handling and removal. The reuseable utensils are collected at a place of deposit different from the refuse receiver D from which they may be periodically removed for subsequent washing and reuse.

In the preferred or exemplary embodiment of the instant invention the conveyor A comprises a horizontally moving endless belt 10 adapted to receive and transport the soiled tray T forwardly (to the left as viewed in FIGS. 1 and 2) along a horizontal path of travel. The belt 10 is driven by a drive roller 12 mounted at the forward end of the belt 10 on a horizontal shaft 14 extending transversely of the belt 10. The shaft 14 is journaled at one end in a bearing 16 mounted on one side-supporting frame 18 of the conveyor A. The opposite end of the shaft 14 extends through a bearing 20 mounted on the other side-supporting frame 22 of the conveyor A and is connected to a suitable source of motive power such as an electric motor (not shown). The rearward end of the belt 10 (not shown) extends around a roller which may be an idler roller but preferably is the roller driven in synchronization as the roller 12. The interconnection between the forward roller 12 and the rearward roller is well known to those skilled in the art and needs no further description.

As the soiled tray T is carried forwardly along the belt 10 it approaches a rocker member generally designated 24 pivotally mounted on a horizontal pin 26 on a portion of the side frame 22 above the belt 10 and rearwardly of the roller 12. Upon reaching the rocker member 24, the tray passes beneath a downwardly extending pin 28 integral with the free end of an arm 30 extending rearwardly from the pivot pin 26. As it continues to move forwardly the tray T engages the free end 32 of an arm 34 extending forwardly from the pivot pin 26 and raises the arm 34 against the force of a coil spring 36. The coil spring 36 is confined at one end on a pin 38 mounted on the frame 22 and its opposite end by a pin 40 integral with the arm 34. The straight line distance between the pin 28 and the free end 32 is greater than the length of a tray. Due to the integral connection between the arms 30 and 34, as the tray T raises the arm 34 in passing thereabove it lowers the arm 30 to a position where the distance between the belt 10 and the lower end of the pin 28 is less than the height of the tray T thereby blocking the passage of the next tray beneath the pin 28. When in this position a spring 42 (FIG. 1) forces the free end of a pin 44 out into the rocking path of the arm 30 above the upper edge of this arm thereby positively locking the arm 30 in its lower position. The opposite end of the pin 44 is connected to the plunger 46 of an electric solenoid 48 mounted on the side frame 22. Energization of the solenoid 48, in a manner described more fully hereinafter, centers the plunger 46 and retracts the pin 44 to release the arm 30.

The tray T upon reaching the forward end of the conveyor A runs off the belt 10 whereby the tray T tips toward a vertical position as best seen in FIG. 2. In falling from the belt 10 the forward end of the tray T strikes against a pair of spaced curved guide rails 50 forming part of the tray tipping means B. The guide rails 50 are supported by having their lower ends secured to the machine frame at 51. The use of gravity as a part of the tray tipping means is preferred because of its simplicity. However, it is to be understood that other mechanical and positively acting tray tipping means could be used and are included within the purview of the instant invention.

Figure 4:
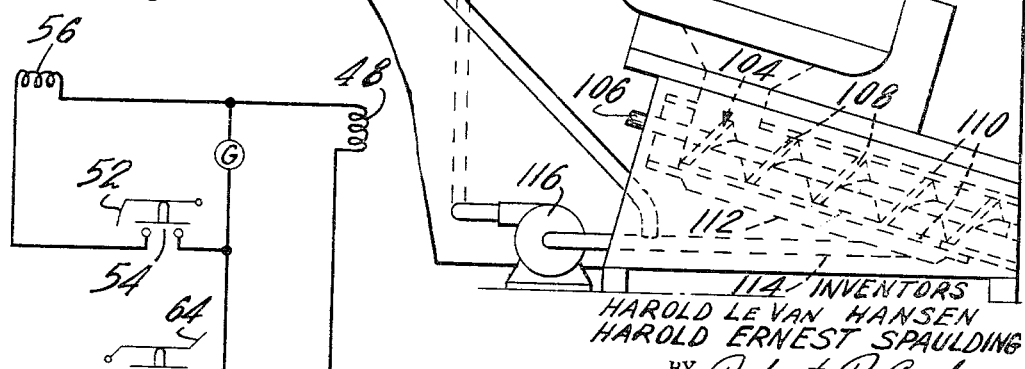
FIG. 4 is a wiring diagram of certain of the electrical components of the instant invention.

As the tray T tips with its forward end sliding along the guide rails 50, its undersurface i.e. that surface opposite from its material carrying surface, engages the actuating finger 52 of a switch 54 which is mounted on the frame member 22 between the end of the roller 12 and the frame 22. Engagement of the finger 52 by the tipped tray T closes the switch 54 supplying current from a generator G (FIG. 4) to an electric solenoid 56 operating the valve 57 of a spray device generally designated 58 to direct a stream of cleaning liquid, preferably water, against the carrying surface of the tipped tray T. The spray device 58 comprises a spray nozzle 60 and a water conduit 62 connected to a suitable source of water (not shown). It will be appreciated that the preponderance of material, waste and utensils on the carrying surface of the tray T will fall therefrom by the action of gravity when the tray is tipped into the position shown in FIG. 2. The water spray from the nozzle 60 has sufficient force to dislodge any material still adhering to the surface of the tipped tray T and to give this surface a cleaning rinse.

Due to the action of gravity the tipped tray continues to slide down the guide rails 50 along the designed path of travel. A switch actuating finger 64 extends upwardly into this path of travel so as to be engaged by the tipped tray passing therealong. Depression of the finger 64 by engagement therewith with a passing tipped tray closes a switch 66 which supplies electric current from the generator G to the solenoid 48 causing retraction of the pin 44 as previously described. Upon retraction of the pin 44 the rockable member 24 is rocked to its initial position by the spring 36, with the free end 32 of the arm 34 slightly spaced from the conveyor 10 and the pin 28 of the arm 30 retracted from the path of travel of the soiled tray T. This permits the next tray to pass beneath the member 24 towards the tray tipping means. The tipped trays after being rinsed and contacting switch fingers 52 and 64 slide off the guide rails 50 into the stacking frame 68 for collection and subsequent removal.

The refuse and utensils removed from the carrying surface of the tipped tray T fall into the trough C. The trough C comprises an inclined bottom 70 having vertically extending forward and rearward side members 72 and 74 respectively. The spray device 58 is mounted at the upper edge of the forward side member 72 opposite the forward end of the conveyor A.

The upper runs of a pair of spaced endless chains 76, 78 move slowly along the inclined bottom 70 of the trough C from its lower end to its upper end, one chain moving adjacent the juncture of the bottom 70 with the side 72 and the other chain moving adjacent the juncture of the bottom 70 on the side 74. The chains are interconnected periodically with rigid, parallel spacers 80 which drag along the upper surface of the bottom 70. Each chain at its lower end extends around spaced idler sprockets 82, 84 mounted on a common shaft 86, which is journaled at one end in the side 72 and the other end in the side 74. At their upper ends the chains 76, 78 extend around drive sprockets 88 and 90 respectively (FIG. 1). Each drive sprocket is mounted on a common shaft 92 which is journaled at one end in the side 72 and in its opposite end extends through a bearing in the side 74 and is connected to a suitable source of power (not shown). The sprockets are rotated in a counterclockwise direction as viewed in FIG. 3.

A pair of spray nozzles 94, 95 direct streams of liquid, preferably water, substantially longitudinally along the bottom 70 of the trough C toward its lower end, which direction is opposite the movement of the upper run of the chains 76, 78. Both the refuse and reuseable utensils falling into the trough C and onto the bottom 70 thereof are engaged by the spacers 80 extending between the chains 76, 78. However, the refuse having a lower specific gravity than the reuseable utensils is floated over the cross spacers 80 by the flow of the water ejected from the nozzles 94, 95 and thereby urged towards the lower end of the trough C; whereas the utensils having a higher specific gravity than the refuse are not floated by the stream of water and are thereby carried by the spacers 80 towards the higher end of the trough C.

The trough bottom 70 has an aperture 96 (FIGS. 1 and 3) therein with a chute 98 disposed therebeneath so that eventually the reusable utensils carried by the spacers 80 drop through the aperture 96 and are directed by means of the chute 98 into a collecting wire basket 100 mounted beneath the trough bottom 70. The basket 100 with the utensils therein is periodically removed through an opening 101 in the side 72 for cleaning and reuse of the utensils. The removed basket is replaced with an empty basket.

The refuse floating down the trough C eventually falls off the trough bottom 70 into the disposal unit D wherein it is comminuted and compacted and the water expressed therefrom. The specific construction of the disposal unit D forms no part of the instant invention. Such disposal units are described in U.S. Patents 2,592,215, 2,641,165, 2,699,629, 2,718,178, 2,729,145 and 2,729,146.

The disposal unit D useful in the instant invention is commercially available under the name of Somat and in general comprises a collecting tub 102 having means in the bottom thereof to grind the refuse or waste to a small particle size. The bottom of the tub 102 is perforated so that the water and ground refuse pass through the perforations in the bottom into an inclined screw 104 rotated on a shaft 106 supplied with motive power from a suitable source (not shown). The comminuted refuse passing through this screw is compressed between the helical blades 108 of the screw and the confining walls 110 thereof whereby the ground refuse is compacted and the water expressed therefrom. The expressed water flows into an inclined collecting pan 112 and thence into the pipe 114 connected to a pump 116. A pipe 118 connected to the lower portion of the utensil receiving basket 100 conducts any water entering the wire basket into the pipe 114 adjacent the low pressure side of the pump 116. The pump 116 feeds the water collected from the screw 104 and from the basket 100 along a pipe 120 to the spray nozzle 94 and thence by means of a T connection and pipe 121 to the nozzle 95.

Figure 7:
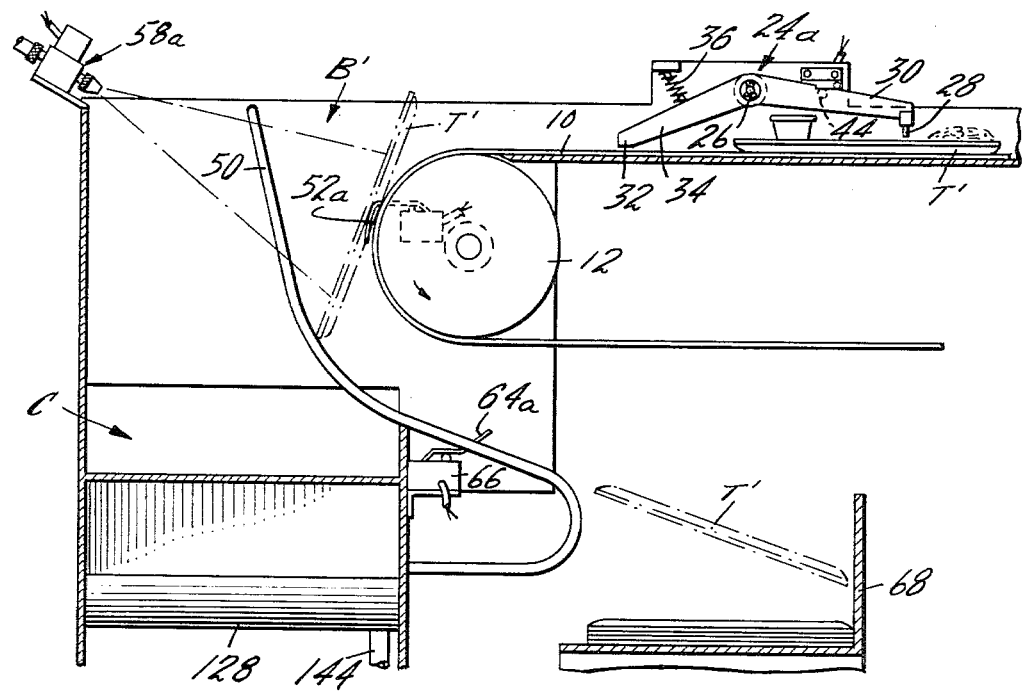
FIG. 7 is a side elevational view, partly in section, taken substantially along line 7—7 of FIG. 6.

FIGS. 5 through 7 disclose a modified form of the instant invention. A soiled tray T' carrying a combination of refuse and reuseable utensils passes along a conveyor A' beneath a tray spacer apparatus 24a to a tray tipping means B' whereupon the refuse and utensils are dumped. The tipped tray activates a switch finger 52a which directs a stream of water onto the carrying surface of the tipped tray from a spray device 58a and thereafter the tipped tray engages a switch finger 64a to reset the tray spacing means 24a. This structure and its operation are exactly the same as heretofore described for similar structure in the preferred embodiment. The presently described modification differs from the preferred embodiment in the trough C' and its associated parts.

The trough C' comprises side walls 122, 124 and an inclined bottom 126 (FIG. 6) therebetween. The inclined bottom 126 extends longitudinally of the trough C' for a portion of its length and then dips downwardly and upwardly to form a well 128. During operation of the apparatus the well 128 is always filled with water, the level of which rises and falls in the trough C' towards the upper edges of the walls 122, 124, by a means more fully described hereinafter. The refuse and utensils falling from the tipped tray T' fall toward the inclined bottom 126 by the action of gravity. Depending on the water level in the trough C', the dumped material will fall either into water or directly onto the surface of the bottom 126. Due to their high specific gravity, the utensils, if they fall into water, will sink to the inclined bottom 126 and slide downwardly therealong into a wire basket 130 maintained within the well 128. The basket 130 may be periodically removed by means of the handles 132 for subsequent washing and reuse of the utensils. The refuse because of its lower specific gravity will float on or near the water surface in the trough C' and thereby away from the heavier utensils which sink to the bottom of the well 128.

Water continuously flows longitudinally downwardly along the inclined bottom 126 from the upper end thereof. This water spurts upwardly from a pipe 134, strikes against the underside of a downwardly inclined baffle 135, and is deflected downwardly and into the trough C'. A valve 136 controls the flow of water from the pipe 134 into the trough C'. A pump 138 supplies the water to a pipe 140 and thence by means of a Y connection 142 into the pipe 134 and also into a pipe 144 connected to the bottom of the well 128. The water flowing from the pipe 144 is continuously bubbling upwardly through the cutlery in the bottom of the wire basket 130 removing soiled particles therefrom but primarily designed to provide an upward current in the trough C' to maintain the lighter refuse floating on or near the surface of the liquid therein.

Situated adjacent the trough C' is a disposal unit D' similar in all respects to the disposal unit D described in conjunction with the preferred embodiment. Above the tub 102a of the disposal unit D' is an extension of the trough C' forming a funnel generally designated 146. The sides 122, 124 of the trough C' also form the sides of the funnel 146 which funnel is closed at its end remote from the trough C' by a vertical end wall 148.

A movable vertical wall 150 separates the funnel 146 from the trough C'. The lower free end of the wall 150 engages against and makes a more or less liquid-proof seal with the horizontally extending flat bottom portion 152 of the funnel 146. Upon oscillation of the wall 150 toward the fixed end wall 148 around a horizontally extending shaft 154, the water having the floating refuse therein which has in effect been dammed up, thereby raising its level, flows over the bottom 152 and downwardly over the inwardly tapered funnel wall 156 into the drum 102a of the disposal unit D'. Thereafter the refuse is comminuted, compacted and water removed therefrom as previously described. The removed water is returned to the system through a pipe 158 to the pump 138.

The shaft 154 to which the upper end of the wall 150 is attached is journaled at one end in an upper extension 159 of the wall 122 and extends through a bearing on an upper extension 160 of the wall 124 and terminates in a pinion 161.

Pinion 161 meshes with a rack 162 having one end thereof integral with the plunger 164 of an electric solenoid 166 also secured to the wall extension 160.

When the water level in the trough C' reaches a predetermined height it substantially covers a waterproof, flexible diaphragm 168 attached to the side wall 124 a short distance below the upper edge thereof. The water upon reaching this level exerts a pressure on the diaphragm 168 forcing it toward the wall 124. The inward forcing or flattening of the diaphragm 168 moves a pin 170 having one end connected to the diaphragm normal to the wall 124. The pin 170 extends through the wall 124, and at its free end is connected to a time delay relay 172. This movement of the pin 170 closes a circuit thereby energizing the solenoid 166 and moving the plunger 164 and its associated rack 162 to the left as viewed in FIG. 5. The movement of the rack 162 rotates the pinion 161 and the shaft 154 thereby oscillating the movable wall 150 to its horizontal position, shown in broken lines in FIG. 6, and permitting the water and refuse in trough C' to flow into the disposal unit D'.

The time delay relay 172 is so designed to maintain energization of the solenoid 166 for a predetermined time interval, for example about 10 seconds. At the end of this time the electrical circuit is broken, the solenoid 166 is de-energized, and the plunger 164 and rack 162 are moved to the right as viewed in FIG. 5 by the action of coil spring 174 confined between the solenoid 166 and a hub 176 at the end of the plunger 164 remote from the rack 162. This lowers the wall 150 to its vertical position closing off the flow of water into the funnel 146 whereby the water level in the trough C' will again begin to rise.

It will be understood that as the water level in the trough C' falls the pressure on the diaphragm 168 is released and the electrical circuit including the solenoid 166 remains closed only through the action of the time delay relay 172. However, the amount the water level can rise is directly controlled by the diaphragm 168. With the above described construction accidental overflow of the trough C' is obviated.

It is thought that the invention and many of its attendant advantages will be understood from the foregoing descriptions and it will be apparent that various changes may be made in the form, construction, and arrangement of the parts without departing from the spirit and scope of the invention or sacrificing all of its material advantages, the form hereinbefore described being merely a preferred embodiment thereof.

We claim:

1. In an apparatus for separating refuse from eating utensils having a higher specific gravity than said refuse, the combination comprising a conveyor for receiving and transporting a soiled tray having a combination of said refuse and said utensils thereon along a predetermined path of travel, means at one end of said conveyor for tipping said tray toward a vertical position to dislodge said refuse and said utensils from said tray by the action of gravity, a rocker member pivotally mounted intermediate its ends having forward and rearward arms extending toward said path of travel, said forward arm extending from said pivotal mounting toward said tray tipping means and said rearward arm extending from said pivotal means away from said tray tipping means, the distance between the free end of each of said arms being greater than the length of said tray, said member when rocked into one position having the free end of said forward arm spaced a distance from said path of travel less than the height of a said tray and the free end of said rearward arm spaced a distance from said path of travel greater than the height of a said tray whereby a said tray in traversing said path of travel passes under the free end of said rearward arm and contacts and raises the free end of said forward arm to pass therebeneath and rock said member into its other position, said member when in said other position having the free end of said forward arm spaced from said path of travel a distance greater than the height of a said tray and the free end of said rearward arm spaced from said path of travel a distance less than the height of a said tray whereby the free end of said rearward arm blocks subsequent trays from passing therebeneath, means associated with said forward arm for yieldably biasing the same toward said path of travel, and means asociated with said rearward arm to releaseably retain said member in said other position.

2. The combination set forth in claim 1 wherein said means associated with said forward arm is a spring and said means associated with said rearward arm is a pin spring biased to have its free end urged into the rocking path of said rearward arm and connected at its opposite end to the plunger of an electric solenoid, said pin when said rockable member is in said other position extending outwardly into said rocking path above said rearward arm to positively maintain said member in said other position, said pin being retractable from its position above said rearward arm by actuation of said solenoid whereby said member is rocked to said one position by the action of said spring on said forward arm, said pin being maintained in its retracted position by the abutment of the free end thereof against the side of said rearward arm.

3. The combination set forth in claim 2 wherein said tray tipping means includes guides for conducting the tipped tray along a predetermined path of travel to a place of storage.

4. The combination set forth in claim 3 having electric switch actuating means in the path of travel of said tipped tray to actuate said solenoid to retract said pin whereby said tipped tray in its passage causes said member to be rocked into said one position thereby permitting a subsequent tray to move toward said tray tipping means.

5. In an apparatus for separating refuse from eating utensils having a higher specific gravity than said refuse, the combination comprising a conveyor for receiving and transporting a tray having a combination of said refuse and said utensils thereon along a predetermined path of travel; means at one end of said conveyor for tipping said tray toward a vertical position to dislodge said refuse and said utensils from said tray by the action of gravity and for directing said tray to a location remote from said utensils and refuse; a trough beneath a portion of said means for tipping and directing the tray, said trough having a bottom and upwardly extending sides for holding a quantity of liquid and for receiving said refuse and utensils therein; means for supplying liquid to the bottom portion of said trough to raise said refuse toward the rising surface of said liquid while permitting said utensils, because of their higher specific gravity, to gravitate to the bottom portion of said trough; an oscillatable wall portion in the upper portion of said trough; means for oscillating said wall portion to open position for draining off the liquid and refuse in said upper portion of the trough, and for oscillating said wall portion to closed position; and means for automatically actuating said oscillating means to move said wall portion to said open position when the liquid level in said trough rises to a predetermined level, to maintain said wall portion in its open position for a predetermined time interval and to move said wall portion to its closed position at the end of said time interval.

References Cited by the Examiner

UNITED STATES PATENTS

| | | | |
|---|---|---|---|
| 1,694,734 | 12/1928 | Cutler | 134—131 |
| 1,756,517 | 4/1930 | Knight | 134—131 |
| 2,103,663 | 12/1937 | Curtis | 209—430 |
| 2,633,253 | 3/1953 | Martin | 214—16.1 |
| 2,729,219 | 1/1956 | Smith | 241—101 X |
| 2,930,484 | 3/1960 | Rodman | 209—430 |
| 2,936,917 | 5/1960 | Musgrave | 214—308 |
| 2,946,438 | 7/1960 | Belugou | 209—156 |
| 2,989,184 | 6/1961 | Gobatti | 209—490 |
| 2,990,064 | 6/1961 | Schoeneck | 209—464 X |
| 3,071,144 | 1/1963 | Hilliker | 134—52 X |

FOREIGN PATENTS 149,909   5/1955   Sweden.

FRANK W. LUTTER, *Primary Examiner.*

HARRY B. THORNTON, RICHARD A. O'LEARY,
*Examiners.*